IRREVERSIBLE DILATION CHARACTERISTICS OF PETROLEUM COKE (RT)
AS A FUNCTION OF CALCINING PROCEDURE.
A—CONVENTIONALLY CALCINED COKE WITHOUT ADDITIVE.
B—RAW COKE CALCINED IN ADMIXTURE WITH 3 WT.% CALCIUM CYANAMID ($CaCN_2$).
C—RAW COKE CALCINED IN ADMIXTURE WITH 30 WT.% SULFUR(S).

United States Patent Office 3,642,962
Patented Feb. 15, 1972

3,642,962
METHOD OF INHIBITING PUFFING IN THE MANUFACTURE OF GRAPHITE ARTICLES FROM SULFUR-CONTAINING PETROLEUM COKE
Rudolph W. Wallouch, Lewistown, N.Y., assignor to Air Reduction Company, Incorporated, New York, N.Y.
Continuation of application Ser. No. 665,579, Sept. 5, 1967. This application May 19, 1970, Ser. No. 37,479
Int. Cl. C01b *31/04*
U.S. Cl. 264—29
3 Claims

ABSTRACT OF THE DISCLOSURE

Cyanamids and carbides of the Group II metals of the Periodic Table, particularly calcium cyanamid and calcium carbide, are used in the manufacture of graphite articles from sulfur-containing carbonaceous materials, particularly petroleum coke, to inhibit puffing during graphitization of the articles. A high purity article is obtained by adding the Group II metal compound to petroleum coke, calcining the coke, and leaching the calcined coke with dilute acid prior to formation and graphitization of the article.

This application is a continuation of my application Ser. No. 665,579, filed Sept. 5, 1967, now abandoned.

BACKGROUND OF INVENTION

This invention relates generally to methodology for upgrading poor quality petroleum cokes, and more particularly to methodology for desulfurizing raw petroleum cokes high in sulfur analysis.

The manufacture of artificial graphite is today principally based upon the use of petroleum coke as raw material. The majority of commercially available petroleum cokes, however, unfortunately display a tendency to expand irreversibly during graphitization, a phenomenon commonly referred to as puffing. The irreversible expansion is rather spontaneous, occurs in a relatively narrow temperature range between 1500° C. to 1900° C., and can destroy the internal structure of the carbon article and thus render it useless.

The cause of the destructive and irreversible expansion of petroleum cokes can be traced to impurities contained in cokes, and especially to sulfur bonded to carbon atoms. The role the element sulfur plays in the irreversible expansion of petroleum cokes is believed to be somewhat as follows: There are a large number of free carbon valencies available on the peripheries of crystalline planes in the coke matrix. During the calcining process to which the raw petroleum coke is exposed, many of the carbon valencies become bonded, either directly to one another at the peripheries of adjacent microcrystals, or indirectly through the intermediary of sulfur atoms. Thus, a typical calcined petroleum coke may be regarded as constituting essentially a three dimensional network of crystallites, partially held rigid by a complicated system of cross-linking carbon-sulfur valence bonds. At sufficiently high temperatures, typically of the order of 1500° C., the broken by temperature motion, causing the release of localized high stress concentrations, which process in turn causes an irreversible expansion of the coke. In some instances, such expansion may amount to as much as 25% of the original volume, and actual cracking or shattering of the product may occur.

In the past, it has been proposed that the irreversible volume expansion and disruptive forces occuring during graphitization of petroleum coke base carbon shapes be minimized in graphite processing by adding ferric oxide to the green mix preceding forming. The use, however, of such compounds as $Fe_2O_3$ as puffing inhibitors, is limited to applications where metal—and particularly iron—impurities are tolerable in the finished product, since heavy metals are removed only incompletely by volatilization during the graphitization cycle. However, there are very many applications where graphite purity—and particularly purity from iron contamination—is an important consideration. The production of pure silicon metal, for instance, is greatly dependent upon the use of low-iron graphite electrodes. Similarly, mercury cell graphite anodes of a very low iron level are mandatory for the electrolysis of sodium metal. Iron is also a highly undesirable contaminant in graphite raw materials for the production of nuclear graphite.

One approach that has been considered in an effort to eliminate the iron impurities introduced by $Fe_2O_3$, is the alternative utilization of calcium carbonate as the active sequestering agent of the present environment. This approach has unfortunately led to as many problems as it has solved in that the compound cited decomposes at the baking and graphitizing temperatures utilized, to yield carbon dioxide, which compound in turn reacts with the carbon of the main composition, thereby depleting portions of the composition structure and reducing the density thereof.

In an attempt to overcome the inherent deficiencies present where iron compounds are so used, it has also been proposed—see for example U.S. Pat. 2,814,076—to utilize alkali metal salts, such as sodium carbonate, in lieu of ferric oxide as puffing inhibiting agents where low iron graphite compositions are desired. While effective to a degree in inhibiting the volume expansion of certain types of coke, with other grades of coke, however, sodium carbonate or the like has the tendency to accelerate rather than inhibit dilatation. This phenomenon is likely due to the intermediate formation of sodium carbide which—as is well-known in the art—tends to produce a phenomenon known as alkali swelling. Moreover, the latter is a notorious oxidation promoter. Because of the foregoing, the possible presence of this latter compound necessitates as a matter of fact considerable care during graphitizing whenever sodium carbonate is initially present in the mix to assure that most traces of sodium are removed from the final product.

Still a further problem limiting the versatility of sodium carbonate in the present environment is the relatively high vapor pressure exhibited by this compound even at temperatures as low as 900° C. Because of this factor, it is relatively impractical to add the compound to a green mix, in that while some of the additive will remain to cause the problems cited in the previous paragraph, not enough will be present to deal with sulfur impurities such as may still be present at the higher graphitization temperatures.

It may be noted from the several foregoing paragraphs that regardless of the particular sequestering agent actually utilized, such agent has invariably been added to and carried out its sequestering function at a relatively late stage in the overall process of artificial graphite formation. As a result, blending of the additive with the high-sulfur coke has never been optimized.

In accordance with the foregoing, it may be regarded as an object of the present invention to provide a method whereby the irreversible volume expansion commonly occurring during graphitization of petroleum based cokes may be minimized.

It is another object of the present invention to provide a method whereby the puffing occurring during graphitization of petroleum based coke may be minimized, yet without introducing undesirable iron impurities into the green mix.

It is a further object of the present invention to provide a method for minimizing puffing in graphitization of high-sulfur content coke, according to which the inhibiting and sequestering substances may optionally be introduced into the raw coke prior to calcining and readily removed together with sequestered sulfur thereafter, whereby a very high purity product remains for subsequent blending and graphitization.

It is another object of the present invention to provide a method for minimizing puffing during graphitization of high-sulfur coke by sequestering the sulfur impurities of petroleum based coke, according to which method the agent utilized may optionally act, and with great effectiveness, during all of the several steps involving calcining, baking, and graphitization of the coke.

It is a still additional object of the present invention to provide a method for minimizing the irreversible volume expansion occurring during graphitization of sulfur-rich coke, which is applicable to a very wide variety of coke types.

It is a still further object of the present invention to provide a method for sequestering of sulfur impurities in poor quality petroleum coke according to which the raw material may be treated prior to its incorporation into a mix destined for graphitization, whereby the raw material may be more effectively blended and reacted with the sequestering agent.

SUMMARY OF INVENTION

Now in accordance with the present invention, the objects recited above, and others as will become apparent in the course of the ensuing specification, are achieved through utilization of cyanamids or carbides of the earth alkali metals of Group II of the Periodic Table as sulfur-sequestering and antipuffing agents. In the preferred practice of the invention, compounds such as calcium cyanamid are added in powder form to raw high-sulfur petroleum coke prior to or during the coke calcining process. Upon completion of the calcining, and if a coke free of impurities is required, the desulfuring products such as—in the example given—calcium sulfide, may be removed from the calcined coke prior to further processing by leaching the latter with dilute acid prior to mixing.

Alternatively, the sequestering agent may be blended with coke tailings, coke flour, and coal tar pitch binder prior to forming, baking, and graphitizing. While the agent, according to this scheme, is neither so intimately blended with nor as readily separable from the mixture as is the case with the first scheme enunciated, essentially all the remaining objects of the invention are yet achieved.

DESCRIPTION OF DRAWINGS

The invention is illustrated by way of example in the attached drawings, in which.

DESCRIPTION OF THE PREFERRED EMBODIMENT

Figure 1:
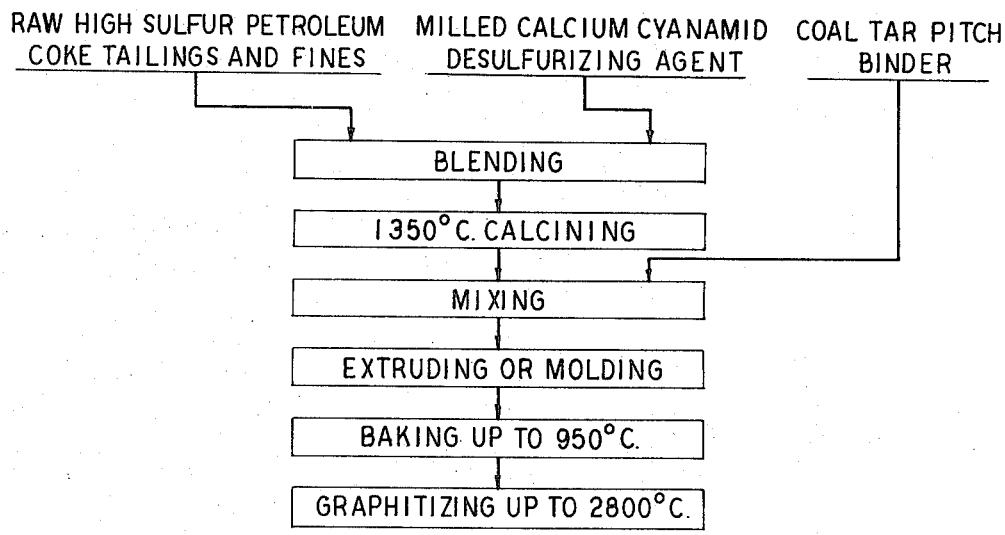
FIG. 1 is a flow diagram illustrating a preferred mode for practicing the present invention.

In FIG. 1 a schematic flow diagram appears illustrating a preferred method for practicing the the present invention. In that figure, raw petroleum coke tailings and fines are used as the initial starting ingredients in the production of an ultimate product comprising a high grade artificial graphite. In accordance withe the results achievable by practice of the present invention, the initial ingredients indicated may be regarded as a second-grade green petroleum coke, by which it is meant to imply that high quantities of sulfur impurities are present.

The raw coke is first intimately mixed with quantities of a Group II metal cyanamid, such as the fine-milled calcium cyanamid shown. Where the desulfurizing agent does in fact comprise calcium cyanamid, the technical grade—which is produced from calcium carbide and nitrogen reacted between 750° C. to 950° C.—may be used, or the so-called "white" grade of calcium cyanamid prepared from calcium oxide, ammonia and carbon monoxide at about 500° C. may be employed. Both types of cyanamids are equally effective for present purposes, although the technical grade is in use more economical.

Following the intensive blending operation, the green coke with the cyanamid additive is calcined in a conventional manner, preferably at temperatures up to 1350° C. The coke as received from the calciner is then sized into tailings and fines which are subsequently placed into a preheated mixer. After an intensive blending operation, coal tar pitch binder is added to the hot mix and mixing is continued until coke filler and binder combine and form an extrudable plastic mass.

After the mixing operation is completed, the carbonaceous mix is transferred to an extrusion or molding press and is formed into a green carbon product destined for conventional graphitization—e.g. the product may typically comprise a green carbon electrode. The formed carbon is then gradually heated in a conventional baking furnace up to 950° C. in order to carbonize the pitch binder and give the carbon body strength. Thereafter the baked carbon is converted into graphite by resistance or induction heating at above 2800° C. At such sustained high temperatures, the carbon-sulfur complexes which are fixed and effectively contained within the coke filler in the presence of calcium cyanamid, will tend to decompose so as to evolve sulfur in a gaseous compound form, but as the cited temperatures are above the 1500° to 1900° C. range at which puffing has been indicated to occur, such evolution is inconsequential.

While the foregoing operations have been particularly described for that case where Group II metal cyanamides—and particularly calcium cyanamid—is the antipuffing sulfur sequestration agent utilized, Group II metal carbides, particularly calcium carbide, may be similarly utilized. The latter compound operates with an efficiency resembling the cyanamid because of its high decomposition temperature and high reactivity with sulfur and sulfur compounds; however, in general, the use of calcium carbide is less desirable than calcium cyanamid in that the carbide presents difficulty in handling because of its tendency to react with the moisture in the air to form explosive acetylene gas.

Figure 2:
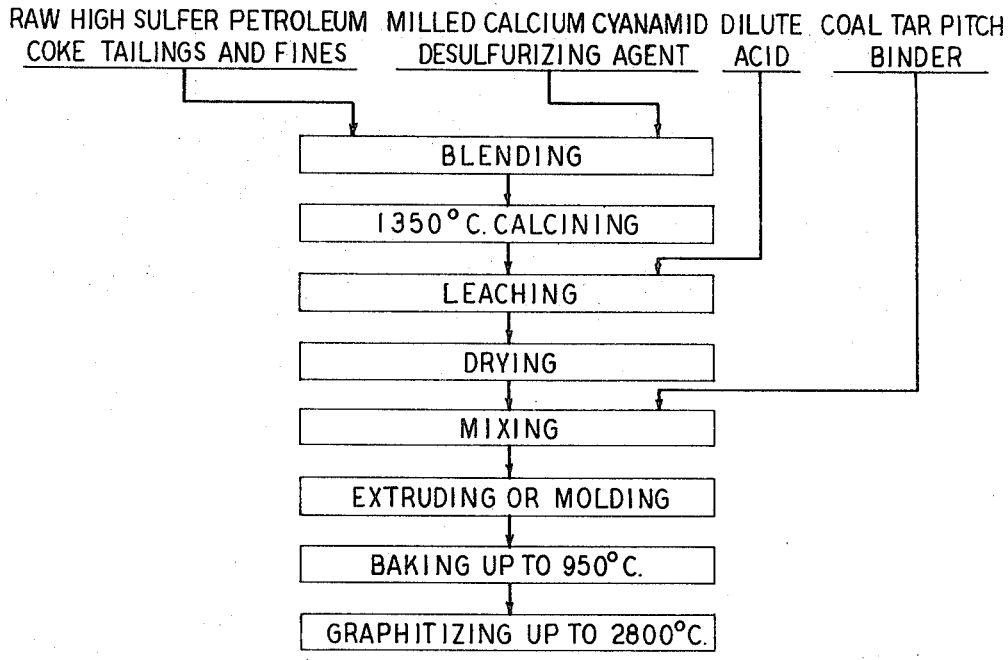
FIG. 2 is a flow diagram illustrating how the FIG. 1 scheme may be modified where it is desired to produce a final product essentially free of the additive represented by the sequestering agent.

FIG. 2 is a schematic flow diagram illustrating how the FIG. 1 scheme may be modified where it is desired to produce a final product essentially free of the additive represented by the sequestering agent. Comparison of the process depicted therein with that represented in FIG. 1 will show that in the present instance the coke residue as received from the calciner is separated from the excess desulfurizing agent and desulfurizing product—such as calcium sulfide (CaS)—by leaching with dilute acid prior to mixing. This method of operation not only eliminates sulfur puffing, but in addition achieves high purification of the graphite—a result which in the past has generally been accomplished only by sustained heating above 2800° C.

Figure 3:
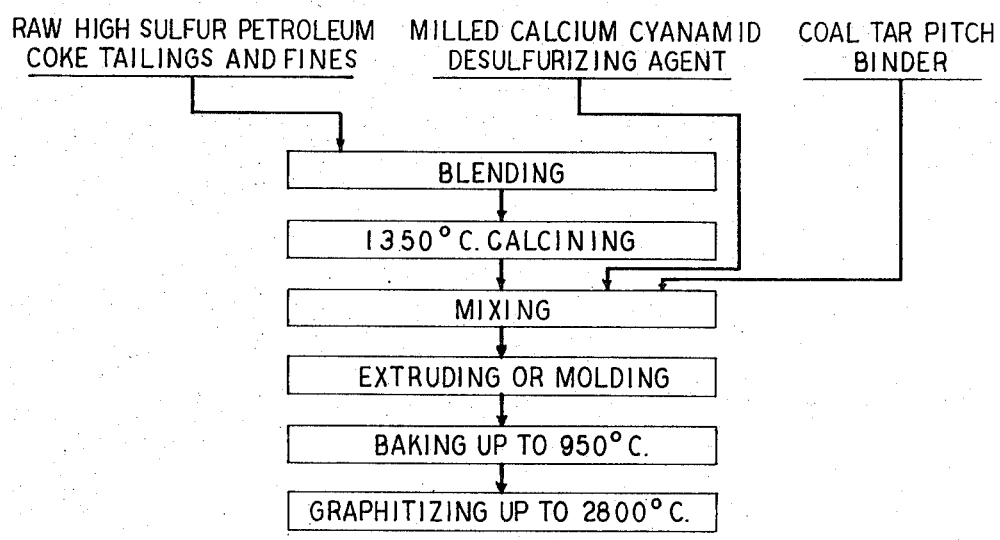
FIG. 3 is a flow diagram illustrating how the invention may be practiced where the sequestering agent is added subsequent to calcining of the raw coke.

In FIG. 3 a schematic flow diagram appears depicting how the invention may be practiced where the sequestering agent is added subsequent to calcining of the raw coke. In this case, the representative calcium cyanamid will be blended in powder form with coke tailings, coke flour and coal tar pitch binder in a heated mixer prior to forming, baking, and graphitization. The following Table I illustrates how remarkably effective additives utilized in accord with the present invention are in preventing puffing and sequestering sulfur, even when added at the relatively late stage depicted in the FIG. 3 scheme. In this instance, $CaCN_2$ was added to a carbon body containing well aligned, vertically calcined petroleum coke with a sulfur content of 1.79%, in accordance with the FIG. 3 scheme, and an analysis was made subsequent to heating to 2750° C:

TABLE I

| $CaCN_2$ (p.p.h.) of coke filler | Percent expansion (across grain) | Temperature range, °C., of irreversible expansion | Bulk density, gm./cc. |
|---|---|---|---|
| None | +1.58 | 1,520–1,645 | 1.395 |
| 0.5 | +0.79 | 1,500–1,740 | 1.410 |
| 1.0 | +0.60 | 1,570–1,700 | 1.477 |
| 2.0 | +0.18 | 1,510–1,710 | *(1.447) |
| 3.0 | +0.03 | 1,510–1,670 | 1.540 |

*Low green density.

It is evident that without $CaCN_2$ there is an excessive expansion in the carbon body starting at 1520° C., causing a linear expansion of +1.58% over the length of the green carbon. If 3 p.p.h. $CaCN_2$ of dry ingredients are added, the carbon body expands only +0.03% and the bulk density is increased from 1.395 gm./cc. to 1.540 gm./cc. In addition, it is found that the remaining sulfur content is less than 0.02% and only traces of iron can be detected.

The high efficacy of the Group II cyanamides as sequestering agents is illustrated in the following example, in which such agents—in accord with the FIGS. 1 and 2 schemes—are added prior to calcining:

Example I

Samples were prepared by blending raw coke particles (35 on 100 mesh sieve) with milled calcium cyanamid

TABLE II

Sulfur analysis of raw petroleum coke after 1,000° C. calcination with and without additives

| Sample No. | Material | Calcining Temperature, °C. | Sulfur, percent |
|---|---|---|---|
| 1 | Plain raw TR coke | 1,000 | 1.06 |
| 2 | Raw RT coke plus 30% sulfur | 1,000 | 2.85 |
| 3 | Raw RT coke plus: | | |
|   | (a) 3% $CaCN_2$ | 1,000 | 0.90 |
|   | (b) 5% $CaCN_2$ | 1,000 | 0.95 |
|   | (c) 10% $CaCN_2$ | 1,000 | 0.81 | and elemental sulfur, respectively. The intimately blended samples were conventionally calcined up to 1000° C. in a laboratory furnace. Sulfur prints were then prepared by placing the calcined materials on photographic plates and moistening which dilute acetic acid in order to generate $H_2S$ which in turn reacts with the silver in the photographic emulsion to form silver sulfide.

The sulfur analysis of the differing samples is listed in Table II above:

The sulfur analysis of the sulfur-treated coke particles is seen to be higher by a factor of approximately 2.5 than in the plain or calcium cyanamid-treated materials. However, examination of the resulting photographs showed that despite the high sulfur content no sulfur print could be obtained with material No. 2 listed in the above table. The sulfur in material No. 2 is combined organic sulfur and therefore non-reactive towards the acetic acid used in preparing the sulfur print.

The addition of calcium cyanamid to raw coke does not change the sulfur level, as indicated in the above Table I. However, the sulfur contained in the raw coke is converted by calcium cyanamid additions during calcining into calcium sulfide (inorganic sulfur) which hydrolyzes readily as evidenced by a high darkening appearing in prints associated with Samples 3(a), (b), and (c). Such photographic results demonstrate the effectiveness of $CaCN_2$ in sequestering sulfur contained in raw petroleum cokes.

The example that now follows emphasizes the advance made in control of puffing by desulfurizing raw petroleum coke during the calcining step.

Example II

Test rods 1" in diameter and approximately 8" long were formed from a 1:1 mixture of coke flour (100 on pan) and coke particles (35 on 100 mesh sieve) using 30 medium pitch as bonding material. The coke particles and flour were prepared by sizing raw coke as specified above, blending with 3% by weight of milled calcium cyanamid (metallurgical grade) and calcining the blend up to 1000° C. The 1" diameter molded rods were 1000° C. baked, reduced in diameter by centerless grinding and subsequently graphitized up to 2650° C. in a high temperature dilatometer.

Figure 4:
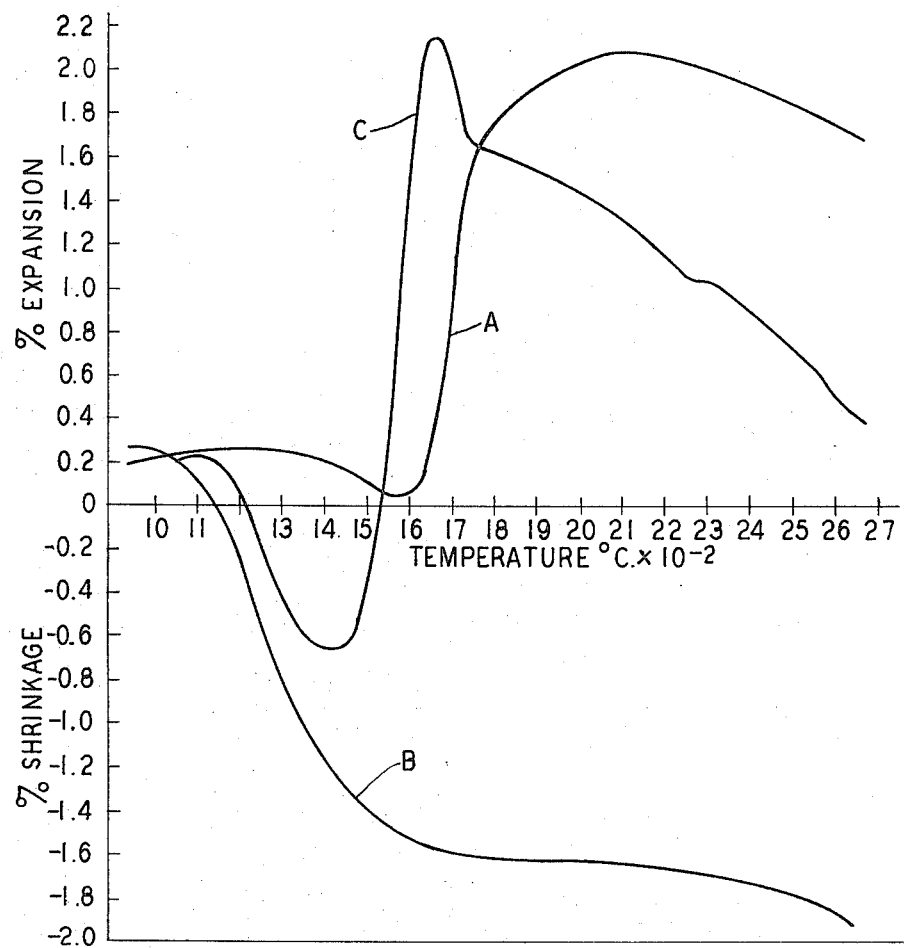
FIG. 4 is a graph of experimental data illustrating the dramatic reduction in puffing achievable through practice of the present invention.

The appended FIG. 4 is a diagram showing the dimensional changes during graphitization of a test rod made from plain calcined coke (curve A), and of a test rod made of petroleum coke which has been calcined in the presence of 3% calcium cyanamide (curve B). The third curve C refers to a test rod molded from coke which has been calcined with 30 wt. percent of elemental sulfur.

The "puffing" data of the three materials are listed in Table III below. Referring to FIG. 4 and Table III, it will be noted that the use of $CaCN_2$ as an additive to green coke overcomes the detrimental expansion of conventionally calcined coke by converting puffing cokes into cokes which are continuously shrinking over the temperature range 1000° C. to 2650° C.

While the present invention has been particularly described in terms of specific embodiments thereof, it will

TABLE III

Irreversible dilation characteristics of petroleum coke as a function of calcining procedure

| Sample Number | 4 | 5 | 6 |
|---|---|---|---|
| Type of additive | None | $CaCN_2$ | Sulfur. |
| Additive level | 0% | 3% | 30%. |
| Irreversible contraction and expansion characteristics | Control sample (A)[1] | Cyanamid test sample (B)[1] | Sulfur test sample (C).[1] |
| Temp. range (° C.) and maximum shrinkage (percent) before dilation | 1,345–1,580° C. shrinkage +0.06% | 1,580–2,115° C. shrinkage +2.00% | 1,110–1,440° C. +0.86%. |
| Temp. range (° C.) of irreversible expansion and total dilation (percent) | | | 1,440–1,655° C. +2.78%. |
| Temp. range (° C.) of maximum rate of dilation in percent | 1,625–1,760° C. shrinkage +1.540% | | 1,440–1,655° C. +2.78%. |
| Percent length change (lasting) at room temperature | +1.63% | −2.42% | +0.06%. |
| Volume change bake to graphite | +2.83% | −5.65% | −0.03%. |
| Density of test rods: | | | |
| Baked | 1.557 | 1.497 | 1.476. |
| Graphitized | 1.485 | 1.461 | 1.359. |

[1] Ref.: FIG. 4.

be understood that in view of the present disclosure, numerous modifications thereof and variations thereupon may now be readily devised by those skilled in the art without yet departing from the teaching herein. Accordingly, the invention is to be broadly construed and limited only by the scope and spirit of the claims now appended hereto.

I claim:

1. A method of making a graphitized carbon article from carbonaceous materials comprising sulfur-containing petroleum coke without the disruptive volume expansion which normally occurs during graphitization of such a carbon article, said method comprising;

(a) mixing the carbonaceous material with a compound selected from the group consisting of $CaCN_2$ and $CaC_2$,
(b) forming the resulting mixture and baking the same at a temperature below about 950° C. to produce a shaped carbon article, and
(c) heating the said article through the 1500° C. to 1900° C. range in which disruptive volume expansion normally occurs to a temperature above about 2650° C. to effect graphitization thereof.

2. The method according to claim 1 in which the compound mixed with the carbonaceous material is $CaCN_2$.

3. The method according to claim 1 in which from 1 to 3% by weight of the petroleum coke of a compound selected from the group consisting of $CaCN_2$ and $CaC_2$ is mixed with the carbonaceous material.

References Cited

UNITED STATES PATENTS

| | | | |
|---|---|---|---|
| 2,814,076 | 11/1957 | Gartland | 264—29 |
| 3,338,993 | 8/1967 | Juel et al. | 264—29 |

OTHER REFERENCES

Brewer et al., "Ind. and Eng. Chem.," vol. 41, 1949.

EDWARD J. MEROS, Primary Examiner

U.S. Cl. X.R.

23—209.1, 209.9; 201—17

UNITED STATES PATENT OFFICE
CERTIFICATE OF CORRECTION

Patent No. 3,642,962     Dated February 15, 1972

Inventor(s) Rudolph W. Wallouch

It is certified that error appears in the above-identified patent and that said Letters Patent are hereby corrected as shown below:

Col. 1, line 61, after "the", second occurrence, the following phrase should be inserted -- structure stabilizing carbon-sulfur valence bonds are --.

Col. 3, line 47, the period (.) after the word "scheme" should be a comma (,), line 71, after "practicing" the word "the" should appear only once, line 75, the word "withe" should read -- with --.

Col. 5, Table II, under the heading "Material" the first line "Plain raw TR coke" should read -- Plain raw RT coke --, line 66, the word "which" should read -- with --.

Col. 6, Table III, under Sample No. 6, line 8, "-0.03%" should read -- -0.30% --.

Signed and sealed this 20th day of June 1972.

(SEAL)
Attest:

EDWARD M. FLETCHER, JR.          ROBERT GOTTSCHALK
Attesting Officer                Commissioner of Patents